United States Patent [19]

Hebert

[11] 4,212,289
[45] Jul. 15, 1980

[54] SOLAR SHUTTER OR BLIND SYSTEM FOR WINDOWS

[76] Inventor: Raymond T. Hebert, P.O. Box 134, Saratoga, Calif. 95070

[21] Appl. No.: 936,374

[22] Filed: Aug. 24, 1978

[51] Int. Cl.² .............................................. F24J 3/02
[52] U.S. Cl. .................................... 126/428; 126/430
[58] Field of Search ........ 126/270, 271, 400, 428–431, 126/450, 436; 237/1 A; 165/104 S, 18, 48

[56] References Cited

U.S. PATENT DOCUMENTS

| 3,863,621 | 2/1975 | Schoenfelder | 237/1 A |
| 3,960,205 | 6/1976 | Laing | 126/400 |
| 4,050,443 | 9/1977 | Peck et al. | 126/429 |

FOREIGN PATENT DOCUMENTS

2624646 12/1977 Fed. Rep. of Germany ........... 126/271

*Primary Examiner*—James C. Yeung
*Attorney, Agent, or Firm*—Robert B. Block

[57] ABSTRACT

A solar shutter or blind for windows using plastic vanes having horizontal channels for encasing a phase change material possessing a high value of heat of fusion at a fusion transition temperature somewhat above the desired ambient temperature of the room to be heated. In one form, the vanes are interconnected together with a reversing mechanism for turning the solar heat collection surfaces of the vanes inwardly or outwardly in relation to the window while in another form the vanes are swung as a unit to face outwardly as a shutter, alongside of a window or inwardly to reradiate energy through the window. In another form the vanes are pivotally mounted as a blind forming array and are provided with solar radiation reflective surfaces on one side and black surfaces on the lower side. In this way reversing the blind array causes reflection of unwanted or excess solar radiation and also provide diffuse illumination.

5 Claims, 7 Drawing Figures

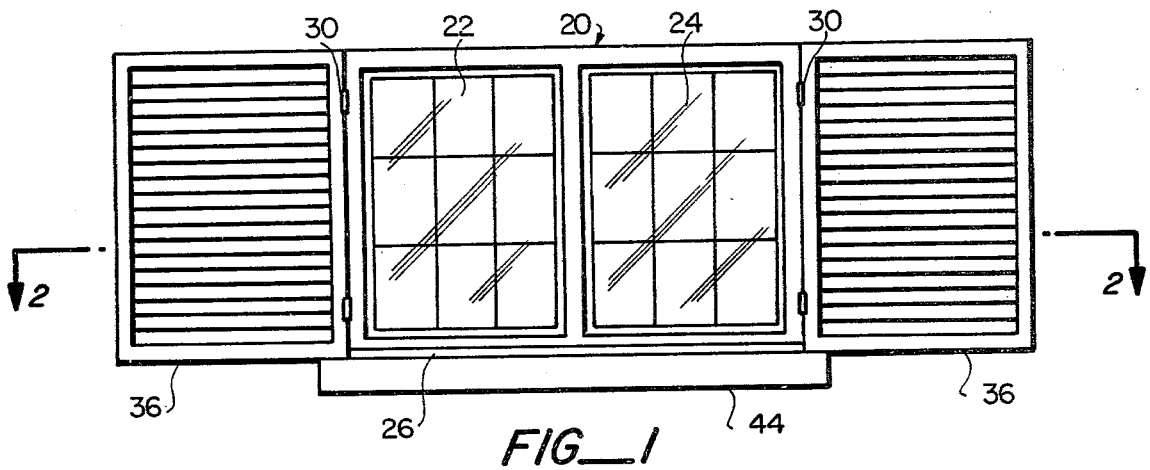
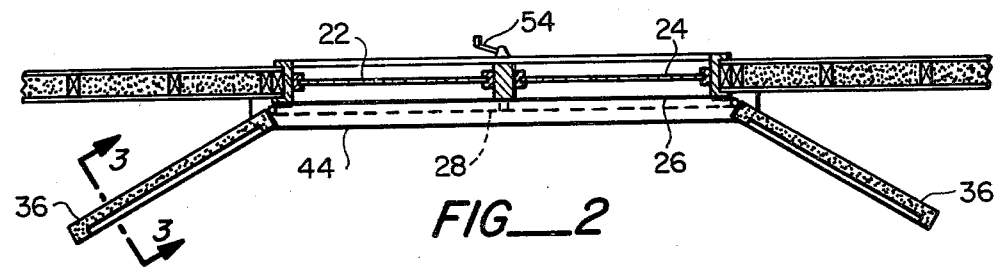
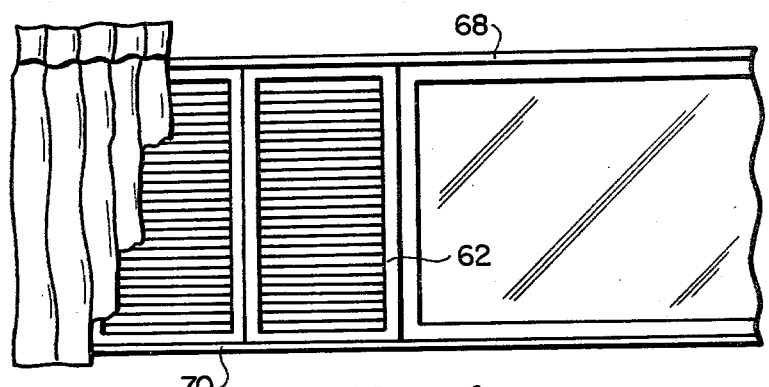
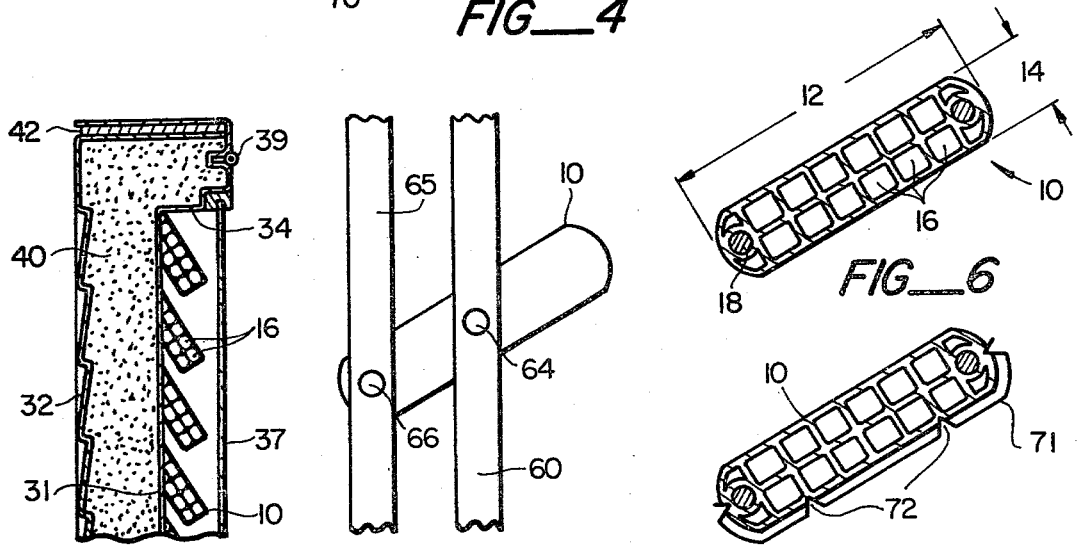

SOLAR SHUTTER OR BLIND SYSTEM FOR WINDOWS

TECHNICAL FIELD

This invention relates to solar heating of buildings in relation to the window structure thereof by a passive shutter or blind system using phase change energy storage.

CROSS REFERENCE TO RELATED APPLICATION

Reference is made to applicant's co-pending application filled concurrently herewith and entitled THERMOSIPHON SOLAR SPACE HEATING SYSTEM WITH PHASE CHANGE MATERIALS, Ser. No. 936,735, filed Aug. 24, 1978 for a more complete description of phase change materials and plastic incapsulating panels, the materials of which are referred to herein and are directly usable in the present invention. Accordingly, the disclosure of the aforementioned specification is incorporated herein by reference.

BACKGROUND AND PRIOR ART

While there have been many recent proposals for developing solar heating systems to replace or at least substantially replace or compliment conventional heating systems, these have contemplated complex installations in order to integrate such systems with the conventional heating systems the latter then serving as backup units. Proposals such as contained in the applicant's co-pending application entitled THERMOSIPHON SOLAR SPACE HEATING SYSTEM WITH PHASE CHANGE MATERIALS previously cross-referenced, attempt to utilize solar heating in a form which does not involve the window structure of the house itself but rather is independent thereof, either installed in the walls or along the outer baseboards of the house. Many solar heating proposals can be criticized in that they are not conveniently packaged for conventional buildings and usually require an independently and remotely positioned solar heat storage system making it necessary to transport a heat absorbing gas or liquid to and from the remote storage through piping or ducting. Additionally, prior systems are not particularly architecturally compatible with the existing buildings and building practices; and, they do not lend themselves to a degree of structural simplicity which would enable them to be installed and utilized by the average homeowner. More importantly, the prior art does not appear to be adapted for use in conjunction with windows. There is a need for a solar heating device which the homeowner can acquire locally and install himself when briefly instructed in a manner requiring no interfacing with existing heating systems. In the present invention no attempt is made to handle all of a building space heating load but it is possible to supply a significant fraction of the heat load requirements can be met as will become apparent.

U.S. Pat. Nos. 4,003,367 and 4,055,055 illustrate the application of thermosiphonic principles to the making of a water heater and a boiler based on the collection of solar energy. However, neither of these disclosures are adapted for use as self-contained units and appear limited to the specific application as water heating devices.

U.S. Pat. No. 4,073,284 illustrates the use of a crystalline phase change material in a solar heating device operated by the saturated vapor of a heat carrier which is used to exchange heat with a phase change material having a storage mass capable of absorbing heat energy in the form of latent heat at a temperature just above room temperature. However, the principle of operation relies on the vaporization of a condensate, the pressure of which is regulated by a ducting system which is in communication with a bellows associated with the unit in order to control condensate level. This unit is designed to operate horizontally at ceiling level where heat is not efficiently distributed. In view of the necessity of operating against gravity between a liquid and a condensate phases in the heat collection system, the unit appears inherently unsuitable for window locations.

U.S. Pat. No. 4,062,351 discloses a water collection through panel having inlet and outlet ports connected to a piping system and presumably thence to a storage facility. In one embodiment disclosed in 4,062,351 (FIG. 19) it is stated that a thermosiphoning process can take place if the unit is tilted up and further it states that a supplemental use of heat retaining crystals can surround the heat transfer pipe in a unit employing fins to assist in exchange of heat from the panel to the material flowing in the transport pipe which presumably leads to a larger heat storage facility. The nature of the crystalline material referred to is not disclosed. This unit employs associated piping to take away energy from the panel rather than utilize it in situ and is therefore not self-contained and is not adapted for use as a window unit.

U.S. Pat. No. 4,034,736 discloses the use of a plurality of horizontally disposed slats resembling a venetian blind in a solar collector, however, air is used to be circulated by a fan through the solar collector for removing energy therefrom and for being sent to a bulk storage facility or to the rooms of a house via air ducts. The use of phase change materials for a high density heat storage and direct radiation or convection is not disclosed.

There is therefore a need for a new and improved structure which will fulfil the requirement of providing a partial or fractional contribution to a building's energy requirements based on solar exposure and heat storage in conjunction with a building's windows and which can be subsequently deployed to heat the building.

OBJECT AND SUMMARY OF THE INVENTION

It is a general object of the present invention to provide a new and improved solar collection system particularly in the form of a solar shutter or blind system for utilization in connection with the windows of a building to contribute at least a fractional part of the energy requirements for heating the same.

A further object of the invention is to collect solar energy with a system associated with the window structure of a building and to maintain that energy until reversed to release the same for interior heating requirements.

A further object of the invention is to provide a solar shutter or blind system for windows of the above character which is of sufficient structural simplicity in that it can be installed and utilized by an average homeowner with brief instructions.

A further object of the invention is to provide a solar system of the above character which requires no interfacing with the existing heating system of a building but which operates completely independently thereof.

Another object of the invention is to provide a solar heating shutter system for windows which effectively blocks nocturnal heat loss through the window when the shutter is used in the manner disclosed.

In summary, the invention preferably utilizes a blind or shutter structure having a plurality of vanes or slat elements therein horizontally disposed in an overlapping vertically spaced array in such a manner as to appear similar to venetian blinds or louvered shutters. As used herein, the word vane will be used generically for the equivalent term slat, as defining an elongate strip or the like as are used in the description and construction of blinds or shutters. In addition, the term "vane" means will also be understood to be synonymous and interchangeable with the term "panel" whether or not a plurality of small width elements are arranged to form a planar array or a single large element serves to cover the same area with a solid heat absorbing member.

Each vane preferably consistss of an elongate generally planar plastic member having a plurality of channels therein which are adapted to receive a phase change material having a heat of fusion transition somewhat above the temperature of the space to be heated. The ends of the channels in the vane are sealed off to prevent escape of the phase change material which is liquified at the aforementioned temperature transition. In the shutter or blind system vane or vanes are aligned with the channels horizontally, disposed so that the channels serve to capture the phase change material and to prevent degrading vertically oriented non-uniformities from developing as the same is cycled through the transition temperature in repeated use.

In the form of the invention utilized as a blind, pivot means are disposed at each end of each vane intermediate the width thereof for permitting each vane to be rotated preferably about its midpoint in space. A further means such as a connecting rod, is attached to a second pivot at at least one end of the vane and permits uniform adjustment of all of the vanes in a selected orientation. The top side of the vanes is painted or otherwise provided with a black solar energy absorbing surface, while the other downward side of the vane may be made white so that when the blind is reversed no further solar energy collection takes place. In the form of a solar shutter the vane units are preferably mounted in a permanent orientation having the appearance of a louvered shutter, that is to say, the vanes are horizontally mounted vertically spaced from each other a uniform distance and fixed in space. The shutter structure includes a mounting arrangement, such as hinges, which permits the shutter to pivotally move toward and away from the window about a hinge line immediately adjacent the window. In this way the exposed solar absorbing surfaces of the shutter vanes are reversed with respect to the window and are positioned in a heat radiating relation therethrough.

These and other features and objects of the invention will become apparent from the following description and claims when taken together with the accompanying drawings of which:

BRIEF DESCRIPTION OF THE DRAWINGS

FIG. 1 is a front elevational view of a conventional window structure together with solar shutter system installed thereon in accordance with the present invention.

FIB. 2 is a cross-sectional view taken along the lines 2—2 of FIG. 1.

FIG. 3 is a cross-sectional view taken along the lines 3—3 of FIG. 2.

FIG. 4 is a front interior elevational view of a window system with draperies and sliding solar blinds adapted to be slid into position proximate the window and constructed in accordance with the present invention.

FIG. 5 is an end view of a portion of the solar blind system of FIG. 4.

FIG. 6 is a cross-sectional view of one of the vanes of the blind structure of FIG. 4.

FIG. 7 is a cross-sectional view of a modified form of vane structure similar to FIG. 6 and constructed in accordance with the present invention.

DETAILED DESCRIPTION OF THE PREFERRED EMBODIMENT

In each of the embodiments described relating to a shutter or blind structure, a common heat storage element is utilized. This element is termed a vane for heat collection and storage and contains a phase change material. The structure of this vane will now be described in detail after which its application in combination to form the shutter and blind structures will be set forth.

Referring generally to the drawings and particularly FIGS. 3 and 6, there are shown cross-sections of the vane 10 structure as constructed in accordance with the present invention. Thus, the vane 10 consists of a rigid plastic material which may be extruded in the cross-sectional shape shown and having an elongate dimension to form a slat like member of width 12 and thickness 14. A plurality of horizontal channels 16 are provided therein and extend nearly the entire length of the vane. The overall dimensions of a typical vane may be as follows: thickness $\frac{1}{8}$-$\frac{5}{8}$" inch, width 2 to 3 inches, length one window section width. As previously referred to, the width (height) dimension 12 is arbitrary such that if only one vane is used to make and cover an entire window length then the width dimension would increase to that length, i.e. the width dimension would become the vertical dimension of the window. If so formed, the vane may be considered in its broadest sense to form an entire panel covering the window. The channels are appropriately dimensioned relative to the strength of the plastic material and the unsupported length thereof and the amount of structural width of the vane which may be relied upon to support them. For the dimensions given above a channel width of about 3/16 inch would be satisfactory. If necessary, metal strips or rodding 18 may be incorporated and extend the length of the vane in order to stiffen and rigidify the structure as may be required.

The channels 16 are filled with a phase change material to be described and are sealed at their ends so as to capture the phase change material and prevent loss of the same when it liquifies. The ends may be closed by fusing or gluing a cover strip over the channel openings after the channels have been filled with the phase change material. The vane structure can be made of any high temperature plastic material which can be molded or extruded into the shape shown. Example includes silicone or fluorocarbon elastomers often containing a graphite or carbon black filler.

The phase change material itself can be selected from substances having melting temperatures high enough above room temperature to promote efficient convection and radiation heat exchange with the room when positioned in a heat transfer mode in relation to the window and yet low enough to prevent overheating of the room. Such phase change materials operate by having a latent heat of fusion related to the transition from a solid form to a liquid form at the aforementioned temperature. Generally, materials having transition temperatures of the order of 90° F. to 110° F. are satisfactory and will be found available by selection from certain salt hydrates. In particular, sodium sulphate decahydrate, $NA_2SO_4.10H_2O$, is a specific example which will work quite well in this application. It has a transition temperature of approximately 90° F.

Such phase change materials are often found to vertically degrade or stratify in respect of their thermal and physical characteristics as they are cycled through the liquid in solid phase transition such that their physical properties may become vertically nonuniform during use. This is believed to be caused by noniniform rehydration when these salts extend vertically for substantial distances. This limits their useful life and that of the entire unit. In order to prevent this, vanes of the present invention have been preferably provided with the horizontal channel structure previously described which maintains the phase change material in generally horizontal regions of limited vertical extent or depth and thereby limits non-homogeniety accordingly.

Means is provided for reversing the orientation of the units with respect to the plane of received radiation, i.e., the plane of the window. In the examples given, such means includes a shutter closure mechanism which swings the shutter over the window bringing the exposed portions of the vanes or panel therein into face to face proximity with the window. Such can be provided by a vertically oriented hinge of a conventional type utilized in shutters and mounted alongside the window. In the blind structure to be described the reversal mechanism consists of a pivotal arrangement disposed at the ends of each vane and a connecting rod interconnecting all vanes for movement about the pivotal connection so that the vanes can be selectively rotated to bring their upper heat absorbing sides into generally forward aspect for receiving solar radiation through the window, or, into a rearwardly facing aspect for rejection of energy after saturating, for summertime use, or for reradiating energy into the room environment. Other examples of reversal mechanisms can be envisioned, as for example, by employing a shutter like arrangement in connection with the interior blind with a hinge disposed on one side of each unit by which the unit can be swung from a position covering the window and reversed in orientation and radiate into the room alongside the window, or a sliding arrangement whereby energy is convected away adjacent to well-insulated walls rather than adjacent to lossy windows.

Referring now to FIGS. 1 through 3 the exterior wall solar shutter system of the present invention will now be described in detail. There is shown a conventional window 20 formed of essentially two side by side window frames in which are disposed conventional windows 22, 24 which may be subdivided for appearance in the manner shown. These are supported above a sill or cornice 26 which in FIG. 2 is shown to contain a mechanism 28 for opening and closing the shutters by operation from the interior of the building. Hinges 30 are disposed in vertical alignment on each side of the window frames and support the solar shutter constructed in accordance with the present invention.

As shown in detail in cross-section in FIG. 3 the shutter structure can be formed by a pair of molded fiberglass half shells 31, 32 having a cross-sectional shape as illustrated. The inner shell is formed with a recess 34 for receiving a plurality or panel of phase change vanes as previously described, each arranged in a horizontal and evenly spaced position with respect to the next vertically adjacent vane so as to form a structure having the physical resemblance of a louvered shutter 36. The vane ends are captured in suitable supporting recesses formed in the shell. The entire vane receiving recess can be covered over to improve collection efficiency and to be protected from the elements by an optional glazing 37 captured in a second circumferential recess surrounding the panels and the opening in general. A flexible weather strip 39 is provided to surround the recess so that as the shutter is closed over the window a weather seal is formed therewith so that convection losses to the exterior are minimized during the period in which the shutter is serving to supply heat to the interior of the building. An efficient, thermally insulating fill 40 such as closed-cell polyurethane foam, is interposed between the inner shell and an outer protective shell which is attached to the inner shell so that the thermal path through glazing into the room is quite efficient with respect to the reverse thermal path through the insulation. The outer shell is also constructed of a molded fiberglass material and is provided with a decorative finish, such as the overlapping vane structure shown, so that when the unit is closed over the window an aesthetic appearance is maintained. In assemblying the unit additional stiffening may be required and is conveniently provided by an elongated steel stiffening bar 42 interposed circumferentially between the shells. The means provided for reversing the orientation of the unit with respect to the window can consist of a conventional cranking system by which rotary movement is applied to cranking rods operating through suitable gears connected to the shutters for moving the shutters between either an open position, flat against the exterior wall of the building for collection of solar energy, or a closed position, with the vanes face-to-face against the window itself, by being swung or rotated about the hinges until the phase change vanes or panel comes into immediate proximity to the windows. Alternatively a cable linkage system is readily adapted to this use. Such mechanisms are generally indicated as being contained within a mechanical module 44 confined within the sill 26. At this juncture the windows may be opened to facilitate heat exchange or closed provided they are of single panel structure and of typical low reflectance. The reversing mechanism may employ either a hand operated crank 54 or electric motor driven drive.

The installation and operation of the shutter system disclosed is exceedingly simple in those applications where a preexisting shutter system and having internally mounted reversing means for closing the shutters has already been provided in the building structure. No more is required than substitution of a shutter unit as constructed in the manner disclosed herein. In other installations hinges will have to be added to the building structure, shutters mounted in the hinges, and a decision made whether or not a specific remotely operable mechanism for closing the shutters is desired. If not, the shutters may be manually rotated about the hinges, the latter serving to facilitate reversal and kept in place by suitable latches.

The back portion of the shutters which face outward when the shutters are closed serve as very effective insulation. This insulation protects the stored energy in the phase change vanes or panels from the outside environment; and, it adds significant insulation value to the windows. Since the majority energy loss in houses is through windows anyway, this structure solves two problems by collecting radiation adjacent the windows during the day and insulating the windows at night.

Referring now to FIGS. 4 through 6 a blind system for use on interior walls is disclosed. Generally, the blind system consists of a plurality of vanes 10 which are mounted on vertical support means such as rods 60 which are supported at their ends in a suitable frame or support structure 62. The ends of each vane are provided with pivot means such as pins 64 which are disposed intermediate the width dimension of each vane and engage and interfit within receiving journals formed in the support rod 60.

Means is provided for reversing the orientation of the vanes and consists of a connecting rod 65 engaging a pin 66 disposed on at least one end of the blind structure and interconnecting all of the vanes thereof at their inner or outer width extremity so that they can be moved in mass to change their angular orientation with respect to the horizontal about the pivot pins. The upper surfaces of the vanes are provided with a dark absorptive surface while the lower side may be optionally provided with a light colored (i.e., either diffusely or specularly reflective) surface for summer reflectance and winter diffuse lighting. By operating the connecting rod the upper surfaces can be brought into general orientation having a substantially forward or outward aspect for receiving solar radiation through the window and absorbing the same. When reversed by movement of the connecting rods so as to bring the surface facing generally outward, sunlight is rejected to avoid excessive collection or for summer use. Intermediate adjustments provide varying degrees of visibility and daylight to the room. The entire unit shown is mounted in slides 68, 70 so that the same can be cleared from the window after sufficient heat has been absorbed. In this way energy can be more efficiently released adjacent to a highly insulated wall, or the window can be left clear for viewing and other purposes when the solar collection unit is not being utilized. While slides are shown, the blind unit could also be hinged at one side in many applications to provide the same reversal of orientation.

In connection with the operation of the present invention it should be pointed out that it shares with all solar collection panels the property that energy is also given off as long as the panel surface is hotter than its environment. This contributes to collection inefficiency and becomes steadily worse as the temperature difference increases, although in the presence of a moderate to intense solar energy, collection generally exceeds such losses in any event. However, the inclusion of a phase change material further enhances collection efficiency in that the losses are minimized by the tendency of the panel to remain at a rather low temperature, that is to say, at the phase change transition temperature. As the phase transition becomes completed and the temperature finally climbs, the decreasing collection efficiency retards damaging thermal runaway since the losses also increase.

In the absence of radiation the panels and vanes of the present invention continue to give off energy via mechanisms of convection, conduction and/or radiation until all latent and sensible thermal energy is depleted. At this point no temperature differential exists between them and the environment. Since the phase change material recommended is effective at slightly above normal room temperature, it tends to release energy in a self-regulating manner giving off less energy to the room as the room temperature climbs since the mechanism of thermal exchange becomes less efficient as that differential temperature decreases.

As above set forth, the reversable vane mechanism is principally provided to enable a reflection of solar input energy back to the environment when the blind has reached its maximum capacity. It should be noted however, that energy will be released by radiation from either side of the blind since the stored heat is emitted at infrared wave lengths and the organic binders of paint and other such materials have usually excellent absorptivity and emissivity in the infrared without regard to their visible color. Thus, the disclosed white painted side of the vane is mainly useful for turning off collection of solar energy by reflection in the visible and for admitting a diffuse light for interior illumination. Should it be desired to further provide for more selective reradiation of the heat energy, the vane may be provided with a metal, i.e., aluminum, half shell 71 on one side in lieu of the painted structure. The half shell may be spaced a slight distance from the vane sidewall by ribs 72 and be formed of a rolled or extruded aluminum shell which is anodized or painted a light color on the outside. Since an air to aluminum interface as shown in FIG. 7 has a significant reflectance in the infrared the effective insulating value is of the order of R1.5 to R2.5 (where R is given in units as $[(hr) (ft^2) (F.°)/BTU]$). Thus, the covered surface will have a lesser tendency to transfer heat energy and a greater tendency to hold the same in storage and when reversed there is less tendency to release heat energy towards the window and significant thermal insulation value is achieved. When so constructed the blind system is functionally quite similar to the shutter system previously described.

In application each configuration will provide a significant benefit where solar exposure of vertical surfaces is favorable from the low angles of the winter sun. However, the shutter configuration is more valuable to frigid climates where solar exposure provides useful daytime heating to the structure through the unobscured windows, and the shutter insulation dramatically reduces the structure's thermal losses through the windows during evening hours or inclement weather. The blind configuration is more ideally suited to moderate climates where the winter's low angle window exposure may tend to overheat the house during the day. The blinds then tend to stabilize temperature over the day by providing daytime shading with efficient low temperature collection, and providing release of stored energy well into the evening hours in a self-regulating fashion. The blind configuration is also preferred in any climate for windows that are too wide to accept the shutter configuration. Of course, they can be used in combination around the structure.

Thus, there has been provided in the presently disclosed invention, alternative structures particularly adapted for use in conjunction with windows of a building either as an exteriorly mounted shutter or an interiorly mounted blind for capturing solar radiation and for being readily reversible for allowing thermal interchange of the stored heat energy with the building interior during non-sunny hours. The units described are particularly simple in operation and lend themselves readily to do-it-yourself installations. Thus, the standard sizes of units constructed in accordance with the present invention could be carried by hardware and building supplies stores so as to make the invention readily available to an average homeowner. To those skilled in the art to which the invention pertains many adaptions and modifications thereof will occur without departing from the spirit and scope of the invention which is to be understood by reference to the accompanying claims.

What is claimed is:

1. A solar shutter system adapted to be exteriorly mounted adjacent a building window comprising a plurality of vanes each said vane having a plurality of elongate channels formed therein, a phase change material disposed and sealed within each of said channels, said phase change material selected to have a solid to liquid transition slightly above desired building temperature and a high heat of fusion associated with said transition, means for mounting said vanes in a spaced parallel array with the elongate dimension thereof horizontal to form a generally planar shutter array approximately the same size as the associated window, means for mounting said shutter for pivotal movement toward and away from the associated window from a position immediately adjacent thereto so that the sides of the vanes exposed when the shutter is fully opened are reversed upon closure to face inwardly toward said window space when the same is closed over the window, and insulation means disposed on the rear side of said planar array so that whenever the shutter is closed heat loss through the window and from the vanes to the outside is minimized while heat is being delivered to the building.

2. A solar shutter system as in claim 1 further in which the means for supporting the vanes is a molded fiberglass reinforced plastic shell and further including a second fiberglass plastic shell interconnected to the first shell and spaced therefrom to form a unitary hollow structure, said insulation means being disposed throughout the space within said structure.

3. A solar shutter system as in claim 2 in which said second plastic shell presents an outside surface when the shutter is closed and decorative means associated with said surface for rendering the same in pleasing harmony with said building.

4. A shutter system as in claim 1 further including a panel of glazing disposed to cover said array of vanes to protect the same against direct convective heat loss to the atmosphere while permitting radiative energy to be absorbed within said vanes.

5. A solar shutter as in claim 1 further including mechanical drive means for moving the shutter between opened and closed positions.

* * * * *